Patented June 14, 1938

2,120,668

UNITED STATES PATENT OFFICE 2,120,668

METHOD OF PURIFYING TETRACHLORO-ETHYLENE

Alden W. Hanson, Midland, Mich., assignor to The Dow Chemical Company, Midland, Mich., a corporation of Michigan No Drawing. Application July 15, 1935, Serial No. 31,453

6 Claims. (Cl. 260—162)

This invention relates to methods for the purification of tetrachloroethylene.

Ordinary methods for the production of tetrachloroethylene yield a product containing small quantities of chlorinated saturated aliphatic hydrocarbons such as trichloroethane, tetrachloroethane, pentachloroethane, etc., from which the tetrachloroethylene cannot be completely freed by usual methods of purification. In addition to the aforesaid impurities, small quantities of unstable toxic compounds of unknown composition are also present, which compounds limit the pharmaceutical applications of tetrachloroethylene.

It is an object of the present invention to free tetrachloroethylene from obnoxious and undesirable impurities of the character above described. Another object is to provide a new and improved process for purifying tetrachloroethylene. A further object is to provide a method of removing the small amounts of toxic material present which is very objectionable in a pharmaceutical material. A more specific object is to produce substantially pure tetrachloroethylene which can be used in contact with metallic apparatus without damage thereto. Further objects will appear hereinafter.

The invention, then, consists in the method of purifying tetrachloroethylene hereinafter fully described and particularly pointed out in the claims, the following description and examples setting forth in detail only certain of the various ways in which the principle of my invention can be employed.

My improved method for the purification of tetrachloroethylene comprises intimately contacting impure tetrachloroethylene at a moderately elevated temperature with a finely divided metal in the presence of water, e. g., about 10 percent by weight thereof, based on the quantity of tetrachloroethylene treated. The metal which I have found most effective and prefer to employ in my process is zinc, although other metals, such as iron, magnesium, and aluminum, or a mixture of any of these, may also be employed. The metal should be in a finely divided state, thereby affording the maximum amount of metal surface in carrying out the purification. By means of such treatment some of the impurities, as tri-, tetra-, and penta-chloroethane, present in the tetrachloroethylene are decomposed into highly volatile products which can be readily distilled off, while tetrachloroethylene itself is substantially unaffected.

In practicing my improved method, the tetrachloroethylene to be purified is mixed with a relatively small amount of a metal in finely divided form, e. g., between about 1 per cent and about 5 per cent thereof, depending upon the amount of impurities present, and with from about 2 per cent to about 10 per cent of water, in both instances based on the weight of tetrachloroethylene to be treated. The use of the suggested quantity of metal results in the obtaining of a high ratio of purified material to metal consumed. However, considerably larger proportions of metal may be employed where decreased metal efficiencies are of less importance than the resultant shortening of the time required for purification. The quantity of water used may also be varied from that stated above, either more or less thereof being employed, if desired. The mixture is preferably heated to boiling in an apparatus provided with a refluxing column. The volatile decomposition products formed from the impurities present, having lower boiling points than the refluxing water-tetrachloroethylene mixture, pass continuously from the top of the column. The refluxing operation is continued until no lower-boiling material is given off. The still residue then consists of hydrated metal compound, unreacted metal, water, and purified tetrachloroethylene, from which the latter material is recovered by usual methods, such as filtration followed by gravity separation and decantation, or by fractional distillation.

Although it is convenient, from the standpoint of ease of control, to heat the reaction mixture to the boiling point during purification, either a lower temperature or a higher temperature under superatmospheric pressure may be employed, so long as the impurities present are reacted upon and decomposed by the added material.

During the refluxing operation the effectiveness of the finely-divided metal may sometimes be reduced because of the hydrated metal compound which tends to coat the surface of the metal. I have found that the formation of the hydrated compound may be prevented by maintaining the reaction mixture in a slightly acidic condition, i.e., having a pH value between 4 and 7. This condition may be secured by adding a small percentage of a material which, in the presence of water, will hydrolyze to give a weak hydrogen-ion concentration, or by adding a weak acid. Thus, acid-reacting salts, such as ammonium chloride, sodium hydrosulphite, sodium bisulphite, or ammonium sulphate, may be employed, or an acid, such as acetic acid, propionic acid, monochloracetic acid, salicylic acid, etc.

The toxic impurities present in ordinary tetrachloroethylene are known to form with benzidine a yellow color or a flocculent precipitate. The standard test is made by treating a quantity of tetrachloroethylene with an equal volume of a 10 per cent solution of benzidine in benzene, and permitting the resultant mixture to stand in the dark for 12 hours. If at the close of this period a yellow color or a precipitate has developed, the tetrachloroethylene is contaminated with unstable toxic impurities, while if no color or precipitate has developed the material is practically free of such impurities. This test will hereinafter be referred to as the "benzidine test". The presence of corrosion-accelerating impurities in impure tetrachloroethylene is determined by measuring the rate of corrosion on weighed metal strips in contact with the material at its boiling point in the presence of water, and comparing the same with the known corrosion rate of pure tetrachloroethylene. Ordinary tetrachloroethylene which gives a positive benzidine test and a high rate of corrosion, when purified by the method herein described, gives a negative benzidine test and shows a greatly decreased rate of corrosion.

The following examples describe several ways in which the principle of my invention has been employed, but are not to be construed as limiting the invention:

Example 1

To commercial tetrachloroethylene, from stock which upon test had been found to give a strongly positive benzidine test, and to corrode iron at the rate of 18.8 milligrams per square inch per 24 hours, was added 2 per cent by weight of powdered zinc, and 3 per cent by weight of water, based on the tetrachloroethylene. The mixture was then boiled under reflux for 12 hours; the temperature at the top of the column being maintained at about 98° C., during which time the evolved vapors of tetrachloroethylene and water were continuously condensed and returned to the still, while all lower-boiling material was vented. Thereafter the residue was divided into three portions and tetrachloroethylene was separated from each by different means, and tested for toxicity and corrosion on iron. One portion, obtained by filtration, gave a negative benzidine test and showed a corrosion rate of 1.40 milligrams per square inch per 24 hours. A second portion, obtained by steam distillation, gave a negative benzidine test and showed a corrosion rate of 1.88 milligrams per square inch per 24 hours. The third portion of tetrachloroethylene, obtained by fractional distillation, gave a negative benzidine test and a corrosion rate of 0.96 milligram per square inch per 24 hours.

Example 2

To 100 cubic centimeters of technical tetrachloroethylene was added 2.4 grams of powdered zinc and 1.2 grams of ammonium chloride and 10 cubic centimeters of water. This mixture was boiled for 27 hours with an upper-column temperature of 98° C. The vapors of tetrachloroethylene and water were continuously condensed in the column and returned to the still. Thereupon tetrachloroethylene was distilled from the mixture and tested for corrosion on iron. The rate was found to be 0.88 milligram per square inch per 24 hours, while the impure material showed a corrosion rate of 38.0 milligrams per square inch per 24 hours, both tests being run under the same conditions. The untreated tetrachloroethylene gave a strongly positive benzidine test, while the purified material gave a negative test.

Example 3

To 200 cubic centimeters of technical tetrachloroethylene there was added 4 grams of finely divided iron and 20 cubic centimeters of water. The mixture was heated under reflux for 12 hours, the tetrachloroethylene being continuously refluxed back into the still, while lower-boiling fractions were removed. The residue was fractionally distilled to give tetrachloroethylene which showed a rate of corrosion on iron of 3.20 milligrams per square inch per 24 hours, as compared to the rate of 18.8 milligrams per square inch per 24 hours for the starting material, both tested under reflux conditions. The treated material gave a negative benzidine reaction while the original material gave a positive reaction.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of freeing tetrachloroethylene from toxic impurities capable of reacting positively to the benzidine test and chlorinated saturated aliphatic hydrocarbons, the steps which consist in adding to the impure tetrachloroethylene a finely divided metal selected from the group consisting of zinc, iron, aluminum, and magnesium, refluxing the mixture in the presence of a substantial proportion of water, and separating pure tetrachloroethylene from the product thereby obtained.

2. In a method of freeing tetrachloroethylene from toxic impurities capable of reacting positively to the benzidine test and chlorinated saturated aliphatic hydrocarbons, the steps which consist in adding to the impure tetrachloroethylene finely divided zinc, refluxing the mixture in the presence of a substantial proportion of water, and separating pure tetrachloroethylene from the product thereby obtained.

3. In a method of freeing tetrachloroethylene from toxic impurities capable of reacting positively to the benzidine test and chlorinated saturated aliphatic hydrocarbons, the steps which consist in adding to the impure tetrachloroethylene a finely divided metal selected from the group consisting of zinc, iron, aluminum and magnesium, refluxing the mixture in the presence of a substantial proportion of an aqueous solution having a pH value between about 4 and about 7, and separating pure tetrachloroethylene from the product thereby obtained.

4. In a method of freeing tetrachloroethylene from toxic impurities capable of reacting positively to the benzidine test and chlorinated saturated aliphatic hydrocarbons, the steps which consist in adding to the impure tetrachloroethylene a finely divided metal selected from the group consisting of zinc, iron, aluminum, and magnesium, and a relatively small amount of a material capable of hydrolyzing in the presence of water to give a weakly acidic solution, refluxing the mixture in the presence of a substantial proportion of water, and separating pure tetrachloroethylene from the product thereby obtained.

5. In a method of freeing tetrachloroethylene from toxic impurities capable of reacting positively to the benzidine test and chlorinated saturated aliphatic hydrocarbons, the steps which consist in adding to the impure tetrachloroethylene a finely divided metal selected from the group consisting of zinc, iron, aluminum, and magnesium, and a substantial proportion of a weak aqueous acid solution, refluxing the mixture and separating pure tetrachloroethylene from the product thereby obtained.

6. In a method of separating tetrachloroethylene from toxic impurities capable of reacting positively to the benzidine test and chlorinated saturated aliphatic hydrocarbons, the steps which consist in refluxing the impure tetrachloroethylene with a substantial proportion of a weak aqueous acid solution and finely divided zinc, and separating pure tetrachloroethylene from the product thereby obtained.

ALDEN W. HANSON.